United States Patent
Poschmann

(10) Patent No.: US 7,323,040 B2
(45) Date of Patent: Jan. 29, 2008

(54) MEMBRANE MODULE FOR THE SEPARATION OF HYDROGEN AND METHOD FOR THE PRODUCTION THEREOF

(75) Inventor: Thomas Poschmann, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 467 days.

(21) Appl. No.: 10/523,088

(22) PCT Filed: Jul. 31, 2003

(86) PCT No.: PCT/DE03/02568

§ 371 (c)(1),
(2), (4) Date: Feb. 2, 2005

(87) PCT Pub. No.: WO2004/014529

PCT Pub. Date: Feb. 19, 2004

(65) Prior Publication Data

US 2006/0162563 A1   Jul. 27, 2006

(30) Foreign Application Priority Data

Aug. 2, 2002 (DE) .............................. 102 35 419

(51) Int. Cl.
*B01D 53/22* (2006.01)
(52) U.S. Cl. .......................... 96/9; 96/7; 96/11; 95/55; 95/56; 55/524; 55/DIG. 5
(58) Field of Classification Search .................. 96/4, 96/7, 9, 11; 95/45, 55, 56; 55/524, DIG. 5
See application file for complete search history.

(56) References Cited

U.S. PATENT DOCUMENTS

| 2,824,620 A | * | 2/1958 | De Rosset | ..................... 95/56 |
| 3,241,293 A | | 3/1966 | Pfefferle | |
| 5,225,080 A | | 7/1993 | Karbachsch et al. | ... 210/321.75 |
| 5,498,278 A | | 3/1996 | Edlund | ......................... 96/11 |

(Continued)

FOREIGN PATENT DOCUMENTS

DE       1 091 990       11/1960

(Continued)

*Primary Examiner*—Jason M. Greene
(74) *Attorney, Agent, or Firm*—Davidson, Davidson & Kappel, LLC

(57) ABSTRACT

A membrane module for the separation of hydrogen is configured for parallel flows and contains a plurality of planar membrane cells which respectively comprise two hydrogen-selective planar membranes respectively surrounded by a flat membrane frame. An air-permeable distancing layer is arranged between the membranes for removal of the permeate gas and a supply frame surrounding a supply area for the reformate gas. All membrane frames and supply frames have the same outer dimensions and form a stack with planar side surfaces. Two membrane frames of each membrane cell have protruding edges directed towards each other, enabling them to enter into contact with each other, except for at least one first opening towards a side surface of the stack. The supply frame is disposed, except for second and third openings towards the side surfaces of the stack, in a closely adjacent manner to the edges of the membrane frame of two neighboring membrane cells. The outsides of all membrane frames and supply frames, except for first, second and third openings, are welded or soldered to each other in a gas-tight manner.

27 Claims, 3 Drawing Sheets

U.S. PATENT DOCUMENTS

| | | | |
|---|---|---|---|
| 5,645,626 A | 7/1997 | Edlund et al. | 95/56 |
| 6,319,306 B1 * | 11/2001 | Edlund et al. | 96/7 |
| 6,527,832 B2 * | 3/2003 | Oku et al. | 96/4 |
| 6,602,325 B1 * | 8/2003 | Frost et al. | 95/56 |
| 6,660,069 B2 * | 12/2003 | Sato et al. | 96/4 |
| 7,033,641 B2 * | 4/2006 | Saijo et al. | 96/11 |
| 7,056,369 B2 * | 6/2006 | Beisswenger et al. | 96/7 |

FOREIGN PATENT DOCUMENTS

| | | |
|---|---|---|
| EP | 1 279 431 | 1/2003 |
| WO | WO 01/70376 | 9/2001 |

* cited by examiner

MEMBRANE MODULE FOR THE SEPARATION OF HYDROGEN AND METHOD FOR THE PRODUCTION THEREOF

The invention relates to a membrane module for separating off hydrogen and to a method for producing it.

BACKGROUND

Fuel cell systems, in particular those used for mobile applications, can be supplied with hydrogen by reforming hydrocarbons such as, for example, methanol, gasoline or diesel. In addition to hydrogen, the product gas formed in a reforming process also contains carbon monoxide, carbon dioxide and steam. In particular, the carbon monoxide has to be removed for use in the fuel cell, since this gas acts as a catalyst poison and leads to losses of power in the fuel cell.

Membranes, which may consist of various materials, such as, for example, ceramic, glass, polymer or metal, have long been used to separate off hydrogen. Metal membranes are distinguished by a high selectivity for hydrogen and a high thermal stability but have relatively low permeation rates.

To achieve a desired permeation rate, a large number of membrane cells each having a hydrogen-selective membrane are used, with the hydrogen-containing reformate gas flowing onto the individual membranes either in series or in parallel. The membrane cells are stacked on top of one another in order to form a compact membrane module.

Membrane modules onto which gas flows in series are described, for example, in U.S. Pat. No. 5,498,278 and U.S. Pat. No. 5,645,626.

A membrane module onto which gas flows in parallel, in accordance with the preambles of patent claims 1 and 14, is known from WO 01/70376. Each membrane cell of the membrane module includes a plurality of oval or approximately rectangular frames stacked on top of one another as supports for hydrogen-selective, planar membranes and for an air-permeable spacer layer for discharging permeate gas, and also two feed frames, which surround feed spaces for reformate gas. All the frames have identical external dimensions and form a compact stack with smooth external surfaces. The frames include holes which are aligned with one another and form passages for the common supply and/or discharge of the process gases, namely on the one hand to supply hydrogen-containing reformate gas from an upstream reforming process, and secondly for discharging the raffinate gas, i.e. the hydrogen-depleted reformate gas, and thirdly for discharging the permeate gas, i.e. the hydrogen which is diffused through the membranes.

Such a membrane module onto which the gas flows in parallel is a very much simpler construction than a membrane module onto which the gas flows in series, since there is no need for structures which divert the permeate gas from cell to cell, as is required when the gas is guided in series.

Nevertheless, the outlay involved in producing the membrane module which is known from WO 01/70376 is considerable, since the gases are diverted within the various frames. The holes in the frames have to be produced with a high degree of accuracy, since any projecting or recessed frame parts or burrs impede the flow of gas and may make it more difficult to produce a gastight seal. An even more serious problem is that manufacturing-related inaccuracies may lead to different magnitudes of partial flows through the individual membrane cells, which has an adverse effect on the permeation rate, as will be explained in more detail below. Finally, the frames have to be connected to one another in a gastight manner over the entire surface in order for the passages and the separation spacers to be reliably separated from one another in a leaktight manner.

SUMMARY OF THE INVENTION

An object of the present invention is to provide a membrane module which can be produced with minimum possible outlay and without the use of seals and without any risk of the gas streams leaking.

The present invention provides a membrane module in which two membrane frames of each membrane cell have raised edges which are directed toward one another and by means of which they are in contact with one another with the exception of at least one opening toward one side face of the stack. The feed frame is designed in such a way that, with the exception of openings toward side faces of the stack, it bears closely against the edges of the membrane frames of two adjacent membrane cells, and that the outer sides of all the membrane frames and feed frames are welded or soldered to one another in a gastight manner, but leaving clear the openings.

The present invention also provides a method a method for producing a membrane module for separating off hydrogen from a reformate gas, the membrane module including a plurality of planar membrane cells stacked on top of one another and connected to one another, each membrane cell including two hydrogen-selective, planar membranes that are each surrounded by a flat membrane frame, an air-permeable spacer layer disposed between the membranes and configured to discharge a permeate gas, and a feed frame that surrounds a feed space for the reformate gas adjacent one of the two membranes, the membrane frames and feed frame having identical external dimensions and being assembled to form a stack with planar side faces. The method includes providing each the two membrane frames of each membrane cell with raised edges directed toward one another and in contact with one another, providing each the two membrane frames with at least one first opening toward a side face of the stack, fitting the feed frame tightly onto the edges of the membrane frames two adjacent membrane cells except for second and third openings in the feed frame toward side faces of the stack, and soldering or welding the outer sides of all the membrane frames and feed frames in a gastight manner except for the first, second, and third openings.

The raised edges in the membrane frames have a certain width, so that they bear flat against one another, and the feed frames are narrower at the edge than the raised edges in the membrane frames and are provided with matching recesses such that they fit accurately into the raised edges from behind.

The membrane frames can easily be produced by punching or stamping flat material, such as for example metal sheet, and the feed frames can be shaped by chip-forming or chipless processors.

After all the frames of a stack have been placed on top of one another, which does not require any excessive degree of accuracy, the stack is simply joined and made gastight by welding or soldering of the outer sides, with the openings for supplying and discharging the process gases being kept open. Associated openings then lie above one another and can be connected in a simple way to a matching feed or discharge passage. Production is particularly simple if all the frames consist of metal, since they can then be connected to one another and to the feed and discharge lines by welding.

In the same operation as that used to produce the raised edges, it is also possible to stamp structures into the membrane frames which cause the reformate gas to be distributed uniformly through the feed space, these structures preferably being webs which are directed toward the reformate gas opening in the feed frame and extend, in particular, in a radial distribution from the reformate gas opening in the direction of a membrane edge.

One significant advantage of the membrane module according to the invention is that only a small number of different components are needed, and these components can be punched or stamped in a simple way. Cross sections which determine the flow resistance and therefore the gas flow rate then result through stamping, which can easily be carried out with a high level of accuracy, so that the individual part-streams through the membrane cells are practically identical and therefore a high overall efficiency is achieved. The overall membrane module can be welded, so that there can be no leakage flows of carbon monoxide into the permeate gas, which cannot always be ensured by seals. In each case only one additional component is required to supply and discharge the reformate, raffinate and permeate gases. The membranes can be used in rectangular form, so that the membrane scrap can be kept at a low level, and they do not have to be perforated in order for permeate gas to pass through them. The parallel routing of the reformate and raffinate gases means that there is no need for any structures for diverting gas from membrane cell to membrane cell, as is required in the case of series flow routing, and consequently the dimensions of the membrane module can be kept small.

BRIEF DESCRIPTION OF THE DRAWINGS

Further features and advantages of the invention will emerge from the is claims and from the following description of an exemplary embodiment with reference to the drawing, in which:

DETAILED DESCRIPTION

Figure 1:
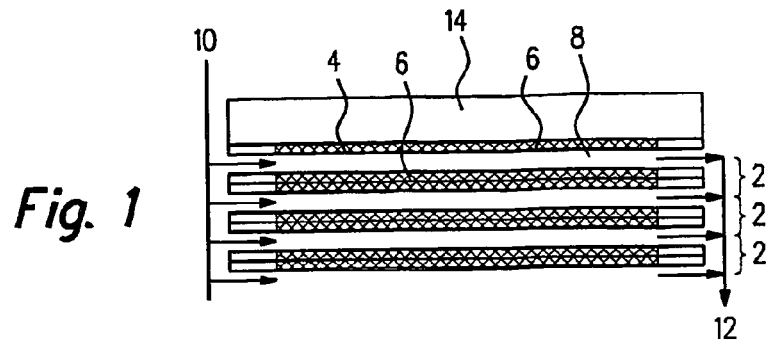
FIG. 1 shows an outline sketch of a membrane module having a multiplicity of membranes onto which gas flows in parallel.

As shown in FIG. 1, a membrane module comprises a multiplicity of planar membrane cells 2 which are arranged above one another and each include two hydrogen-selective, planar membranes 4, between which there is an air-permeable spacer layer 6.

The membranes 4 are preferably metal foils made from palladium, palladium alloys or refractory metals, such as vanadium, niobium and tantalum and alloys thereof. They ensure a virtually infinite selectivity for hydrogen and therefore a purity of the permeate gas which is sufficient to supply fuel cells. Alternatively, it is possible to use composite membranes, for example, hydrogen-selective membranes on a porous support structure which may, for example, consist of ceramic or porous stainless steel.

In each case two membrane cells 2 are separated from one another by feed spaces 8, into which pressurized hydrogen-containing reformate gas 10, which is obtained in an upstream reforming process, for example, from methanol, gasoline or diesel, is fed from one side of the stack of membrane cells 2.

Some of the hydrogen contained in the reformate gas 10 diffuses through the membranes 4 into the air-permeable spacer layer 6 when the hydrogen-containing reformate gas flows along the membranes 4. This means that the hydrogen content or the hydrogen partial pressure is reduced while the gas is flowing along the membranes 4 and emerges from the stack of membrane cells 2 as hydrogen-depleted raffinate gas 12 at the opposite side from the reformate gas inlet, as indicated by arrows in FIG. 1.

The permeate gas which has diffused through the membranes 4 is high-purity hydrogen which is collected in the spacer layer 6 and discharged laterally (not shown in FIG. 1).

At the upper and lower ends of the stack of membrane cells 2, adjacent to the last feed space 8, there is in each case a single hydrogen-selective membrane 4, an air-permeable spacer layer 6 and an end plate 14 for sealing and supporting the last layers with respect to the internal gas pressure of the membrane module. FIG. 1 shows just one upper end plate 14.

It has been found that the maximum permeation rate which is theoretically possible is achieved not only in the case of membrane modules onto which gas flows in series, as described, for example in U.S. Pat. No. 5,498,278 and U.S. Pat. No. 5,645,626 but also when the gas flows onto the modules in parallel, as shown in FIG. 1, provided that the individual part-streams through the feed spaces 8, indicated by arrows, are of sufficient magnitude. Furthermore, it was established by simulation for ten part-streams that even if the part-streams differ with deviations of 10% from one another, the permeation rate, under simulation conditions close to those encountered in practice, is only lower by at most 3% than the maximum permeation capacity which is theoretically possible. On the other hand, if the cross sections of the reformate gas feed line and the raffinate gas discharge line are designed suitably, it is possible to ensure even with gas which flows in parallel that the part-streams are virtually equal (since the flow resistance is equal in all the flow passages).

A membrane module with which virtually identical part-streams can be ensured yet which nevertheless can be produced with little outlay will now be described in detail with reference to FIGS. 2 to 5, in which components which are functionally identical to those shown in FIG. 1 are denoted by the same reference numerals.

Figure 2:
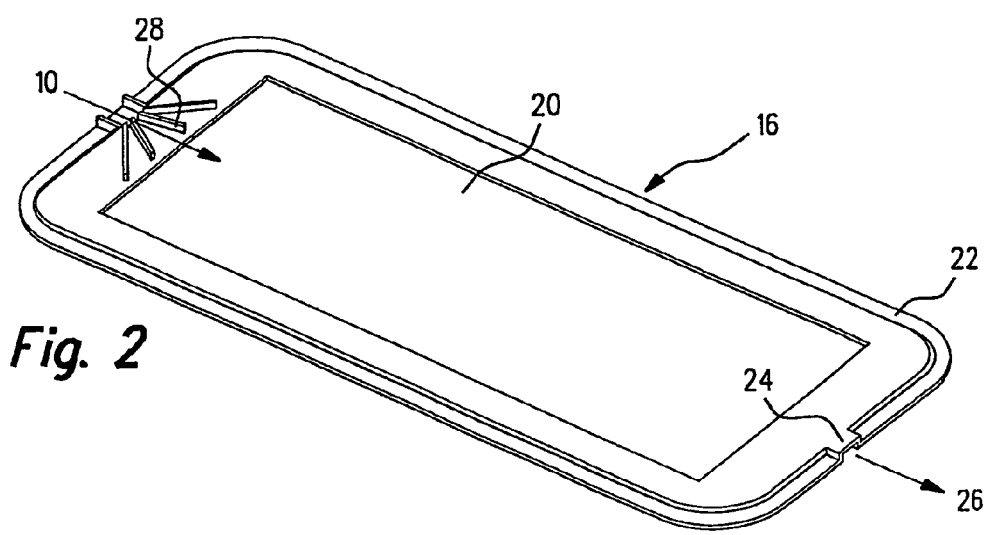
FIG. 2 shows a perspective view of a membrane frame.

Each membrane cell 2 includes two flat membrane frames 16 one of which is shown in FIG. 2 and which each bear a membrane 4. Furthermore, each membrane cell 2 includes an air-permeable spacer layer 6 between the membranes 4 and an annular feed frame 18 (FIG. 3), which has the same external dimensions as the membrane frames 16, the external dimensions in this case being formed by a rectangle with rounded corners. An individual membrane cell 2 in the assembled state is shown in FIG. 4.

As shown in FIG. 2 each membrane frame 16 is a substantially planar component, which has been stamped from stainless steel sheet, in the shape of a rectangle with rounded corners, which in the center has a rectangular opening 20 for the membrane 4 and into which a raised edge 22 has been stamped. The raised edge 22 has a certain width over which it is planar and extends parallel to the plane of the inner region of the membrane frame 16, offset at a short distance therefrom, specifically downward in FIG. 2. In a section in the center of a narrow side of the membrane frame 16, the metal sheet is not stamped to form the raised edge 22, but rather extends in the same plane as the inner region of the membrane frame 16, so that in this section the raised edge 22 includes a recess 24 through which the permeate gas 26 is discharged.

Four webs 28 project from the upper surface of the membrane frame 16, as seen in FIG. 2, which webs extend approximately from the center of the narrow side of the membrane frame 16 which lies on the opposite side from the narrow side comprising the recess 24 in a star shape virtually as far as the rectangular opening 20 in the membrane frame 16. The webs 28 together with the webs 28 of an adjacent membrane frame 16 form a distributor structure which distributes the reformate gas 10, which is supplied on this side of the membrane frame 16, uniformly over the entire width of the membrane 4.

The webs 28 can be stamped into the metal sheet of the membrane frame 16 in the same operation as that in which the raised edge 22 is stamped, and the stamping can be carried out in the same operation as that in which the membrane frame 16 is punched out of sheet-metal material.

Figure 3:
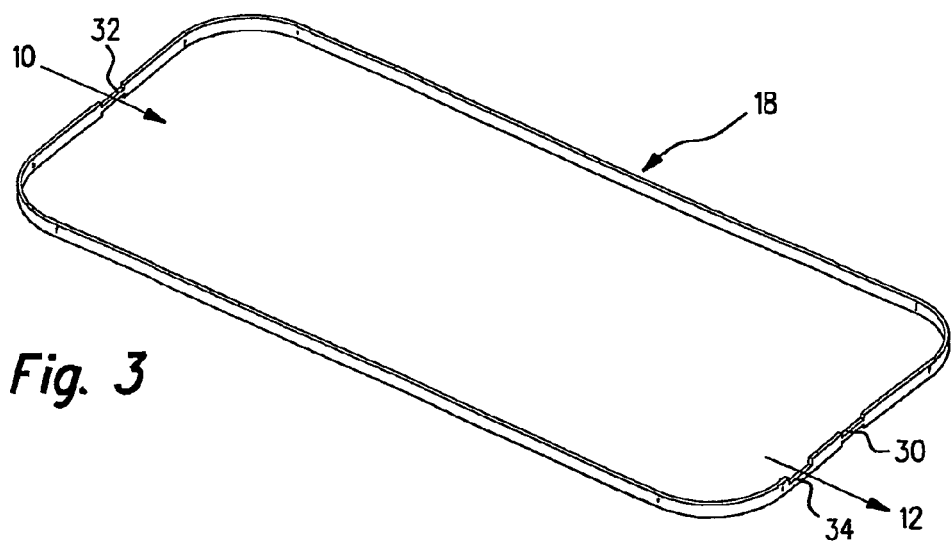
FIG. 3 shows a perspective view of a feed frame.
Figure 4:
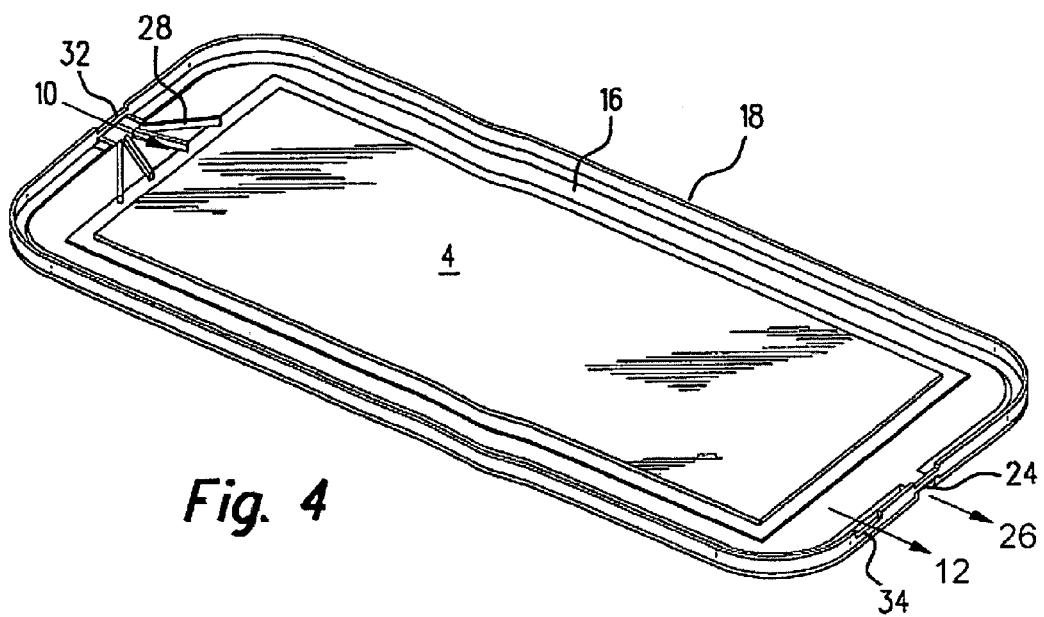
FIG. 4 shows a perspective view of a membrane cell.

The feed frame 18 shown in FIG. 3 takes the form of a continuous annular strip which closes off a feed space 8 (FIG. 1) for reformate gas 10, toward the sides of the membrane module. The annular feed frame 18 is slightly higher than the total thickness of a membrane frame 16, narrower than the raised edges 22 in the membrane frames 16 and is provided with recesses 30 which correspond to the recesses 24 in the membrane frames 16, so that it accurately fits into the raised edges 22 when it is assembled with the membrane frames 16 of two adjacent membrane cells 4. The feed frame 18 can be produced, for example, by stamping or by milling, bending and welding together strip material.

The state in which a feed frame 18 (in a position turned about its longitudinal axis with respect to the position shown in FIG. 3) bears on the membrane frame 16 is shown in FIG. 4. A further membrane frame 16 is placed onto the opposite side of the membrane frame 16 (in a position turned about its longitudinal axis with respect to the position shown in FIG. 2). As can be seen, the recesses 24 in the two membrane frames 16 form a permeate outlet passage for discharging the permeate gas 26.

As can be seen in FIG. 3, the feed frame 18 also includes recesses 32 and 34 which, together with the adjoining membrane frame 16, form an inlet passage for the reformate gas 10 and an outlet passage for the raffinate gas 12, which can be seen in FIG. 4.

Before the membrane frames 16 are joined together, as shown in FIG. 4, the membranes 4, which are slightly larger than the rectangular opening 20 in each membrane frame 16, are welded in a gastight manner onto the edges of the openings 20, preferably on the side of the spacer layer 6, so that the membrane 4 bears directly on the spacer layer 6. The membranes 4 can be connected to the respective membrane frames 16 by means of various welding processes, for example, electron beam welding, laser beam welding, ultrasound welding or resistance roll seam welding, or by means of soldering processes. A spacer layer 6, the thickness of which is double the offset of the raised edge 22 of the membrane frame 16 with respect to the inner region of the membrane frame 16, is placed between each pair of membrane frames 16.

The spacer layer 6 consists, for example, of a stainless steel mesh or nonwoven or comprises a multilayer structure and has the function of supporting the membranes 4 against the trans-membrane pressure difference between reformate gas 10 and permeate gas 26 in operation and of discharging the permeate gas 26 which has diffused through the membranes 4 toward the permeate outlet passage parallel to the membrane surface.

To produce a complete membrane module, a multiplicity of the membrane cells 2 shown in FIG. 4 are stacked on top of one another. In each case one single membrane frame 16 with installed membrane 4 and a spacer layer 6 are arranged at the upper and lower ends of the stack of membrane cells 2. Last of all, stable end plates 14 are fitted, holding the membrane module together with respect to the internal gas pressure.

Figure 5:
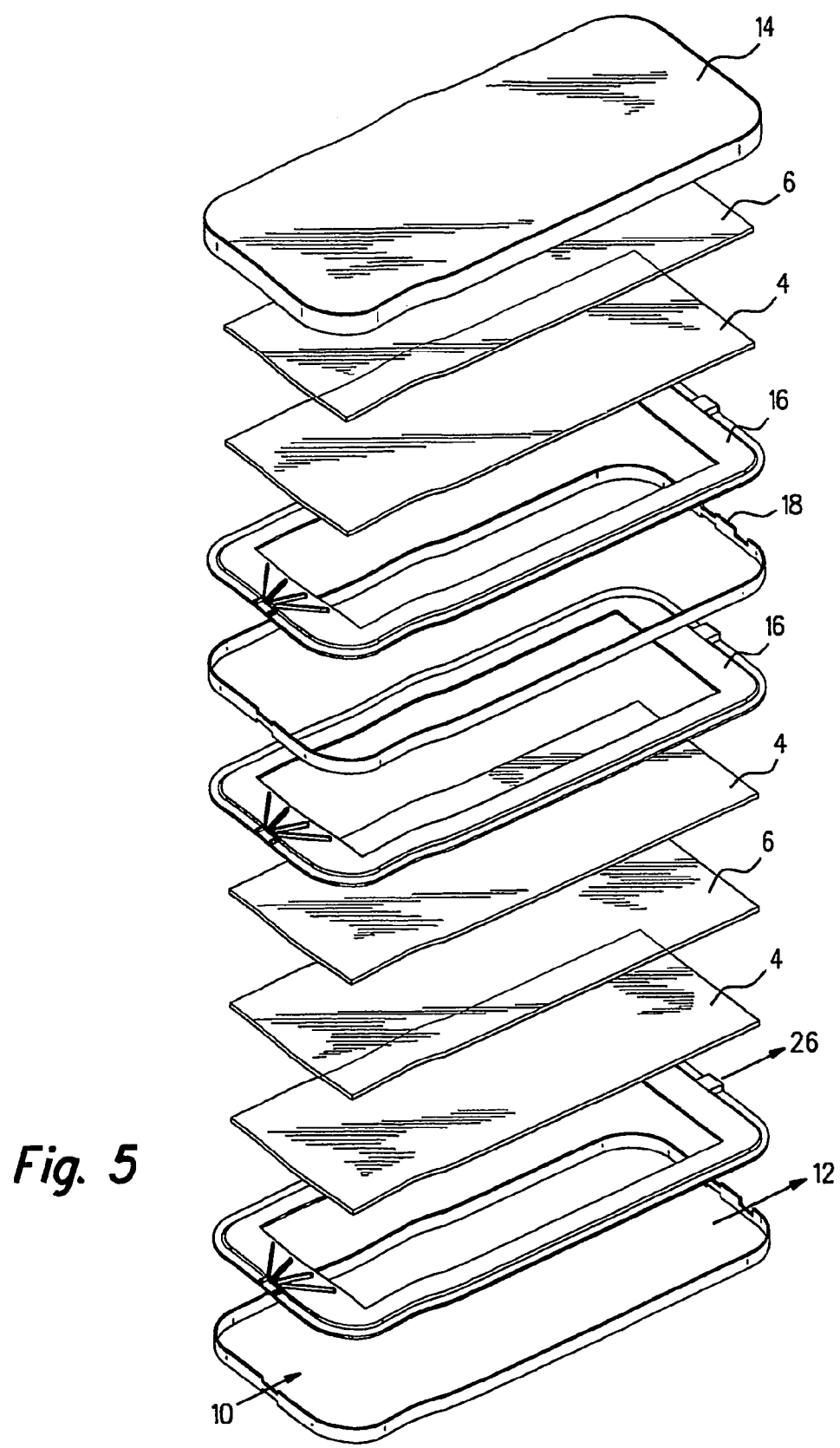
FIG. 5 shows a perspective exploded view of part of a membrane module including one of two end plates.

This type of cell closure structure, which has already been described in general terms with reference to FIG. 1, can be seen in more detail from FIG. 5, which shows an exploded view of the topmost part of the membrane module, including two membrane cells 2. The cell closure structure with a single membrane frame 16 beneath the spacer layer 6 and the end plate 14 ensures that reformate gas part-streams which are passed through the membrane module closest to the end plates 14 flow over the same membrane surface area as all the other part-streams.

Once the stack of membrane cells 2 has been assembled, the membrane frames 16, the feed frames 18 and the end plates 14 are welded together, with the result that a compact stack is formed, which is gastight apart from the inlet and outlet passages for the reformate gas 10, the raffinate gas 12 and the permeate gas 26. The inlet and outlet passages for the reformate gas 10, the raffinate gas 12 and the permeate gas 26 in each case rest accurately above one another and in each case form a rectangle onto which a matching feed or discharge tube or the like, is welded.

The invention claimed is:

1. A membrane module for separating off hydrogen from a reformate gas and having a plurality of planar membrane cells, each of the plurality of membrane cells comprising:
   two hydrogen-selective planar membranes;
   two flat membrane frames, each surrounding one of the two membranes and each having a raised edge, each of the two frames disposed so that the raised edges face one another and contact one another;
   an air-permeable spacer layer disposed between the two membranes and configured to discharge permeate gas;
   a feed frame surrounding a feed space for the reformate gas adjacent one of the two membranes and bearing closely against the edges the membrane frame, the feed frame having external dimensions corresponding to external dimensions of the membrane frames and forming, together with the membrane frames, a stack having planar sides faces, wherein the membrane frames each include a first opening towards a side face of the stack, wherein the feed frame includes second and third openings toward side faces of the stack, and wherein one of the membrane frames and the feed frame are connected together in a gastight manner except for the first, second and third openings.

2. The membrane module as recited in claim 1, wherein the membrane frames and the feed frame are connected together by welding or soldering.

3. The membrane module as recited in claim 1, wherein each of the membrane frames includes a plurality of webs directed toward one of the second and third openings in the feed frame.

4. The membrane module as recited in claim 3, wherein the webs extend in a radial distribution from the second or third opening in a direction of an edge of the membrane.

5. The membrane module as recited in claim 1, wherein each of the membrane frames includes a flat material and wherein at least one of the raised edge, the first opening and the webs are stamped.

6. The membrane module as recited in claim 1, wherein each of the membrane frames includes a stamped metal sheet.

7. The membrane module as recited in claim 6, wherein each of the two membrane frames are welded together at their raised edges.

8. The membrane module as recited in claim 1, wherein the feed frame includes continuous annular strips that are narrower than the raised edges of the membrane frames.

9. The membrane module as recited in claim 8, wherein the second and third openings are recesses in the strips.

10. The membrane module as recited in claim 1, wherein the feed frame includes metal.

11. The membrane module as recited in claim 7, wherein the membrane frame and the feed frame are welded together.

12. The membrane module as recited in claim 11, further comprising a plurality of passages welded to the side faces of the stack and connecting at least two of the first second and third openings to each other and to the outside of the stack.

13. The membrane module as recited in claim 11, further comprising further membrane cells on the topmost and bottommost feed spaces of the stack, wherein the further membrane cells include a further membrane frame surrounding a further membrane, a further spacer layer adjacent the further membrane and an end plate adjacent the further spacer layer.

14. The membrane module as recited in claim 11, wherein the external dimensions of the membrane frames and the feed frames are in the shape of a rectangle with rounded corners.

15. A method for producing a membrane module for separating off hydrogen from a reformate gas, the membrane module including a plurality of planar membrane cells stacked on top of one another and connected to one another, each membrane cell including two hydrogen-selective, planar membranes that are each surrounded by a flat membrane frame, an air-permeable spacer layer disposed between the membranes and configured to discharge a permeate gas, and a feed frame that surrounds a feed space for the reformate gas adjacent one of the two membranes, the membrane frames and feed frame having identical external dimensions and being assembled to form a stack with planar side faces, the method comprising:

providing each of the two membrane frames of each membrane cell with raised edges directed toward one another and in contact with one another;

providing each of the two membrane frames with at least one first opening toward a side face of the stack;

fitting the feed frame tightly onto the edges of the membrane frames of two adjacent membrane cells except for second and third openings in the feed frame toward side faces of the stack; and connecting by one of soldering and welding the outer sides of all the membrane frames and feed frames in a gastight manner except for the first, second, and third openings.

16. The method as recited in claim 15, further comprising providing the membrane frames with webs directed toward one of the second and third openings.

17. The method as recited in claim 16, wherein the webs are provided so as to extend in a radial distribution from the second and third opening in the direction of a membrane edge.

18. The method as recited in claim 15, wherein the providing of the membrane frames includes stamping the raised edges and the at least one first opening into a flat material.

19. The method as recited in claim 15, wherein the membrane frames are stamped from sheet metal.

20. The method as recited in claim 19, further comprising welding together the two membrane frames of each membrane cell at the raised edges.

21. The method as recited in claim 15, wherein the feed frames include continuous annular strips that are narrower than the raised edges.

22. The method as recited in claim 21, wherein the openings in the feed frames are formed by recesses in the strips.

23. The method as recited in claim 15, wherein the feed frames include metal.

24. The method as recited in claim 19, wherein the membrane frames and the feed frames are welded together.

25. The method as recited in claim 24, further comprising welding passages onto the side faces of the stack and connecting corresponding ones of the first, second and third openings to one another and to the outer side.

26. The method as recited in claim 15, further comprising disposing further membrane cells on the topmost and bottommost feed spaces of the stack, each further membrane cell including a further membrane frame surrounding a further membrane, a further spacer layer disposed adjacent to the further membrane and an end plate disposed adjacent to the further spacer layer.

27. The method as recited in claim 15, wherein the external dimensions of the membrane frames and the feed frames form a rectangle with rounded corners.

* * * * *